United States Patent
Eguchi et al.

(10) Patent No.: US 7,830,680 B2
(45) Date of Patent: Nov. 9, 2010

(54) POWER UNIT

(75) Inventors: Hiroyuki Eguchi, Wako (JP); Motohiro Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 11/576,184

(22) PCT Filed: Sep. 15, 2005

(86) PCT No.: PCT/JP2005/017017

§ 371 (c)(1),
(2), (4) Date: Mar. 28, 2007

(87) PCT Pub. No.: WO2006/035612

PCT Pub. Date: Apr. 6, 2006

(65) Prior Publication Data

US 2008/0259666 A1 Oct. 23, 2008

(30) Foreign Application Priority Data

Sep. 30, 2004 (JP) .............................. 2004-287571

(51) Int. Cl.
*H02M 5/45* (2006.01)
*H02H 7/122* (2006.01)

(52) U.S. Cl. ..................................... 363/37; 363/56.05

(58) Field of Classification Search ................... 363/34, 363/35, 37, 89, 98, 125, 131, 56.02, 56.03, 363/56.05; 323/267, 299; 307/18, 23, 24, 307/44, 45, 64

See application file for complete search history.

(56) References Cited

U.S. PATENT DOCUMENTS 5,347,164 A * 9/1994 Yeh .............................. 307/66

(Continued)

FOREIGN PATENT DOCUMENTS

JP 7-101994 B2 11/1995

(Continued)

OTHER PUBLICATIONS

Translation of International Preliminary Report on Patentability mailed Apr. 12, 2007 of International Application No. PCT/JP2005/017017.

(Continued)

*Primary Examiner*—Gary L Laxton
(74) *Attorney, Agent, or Firm*—Westerman, Hattori, Daniels & Adrian, LLP

(57) ABSTRACT

The invention makes it possible to secure a maximum output within the capacity range of an electrical power source by preventing an output from being cut by a protective function of a converter at the time of a temporary overload. A bidirectional DC-DC converter 4 for stepping up a voltage of DC power supplied from a battery 5 is provided. A stepped-up DC power is converted to an AC power by an inverter 3-2 via a regulator 3-1 and is outputted to the load side. An input voltage V1 of the regulator 3-1 is detected by a voltage detecting portion 15 and is inputted into an output limit determining portion 16. The output limit determining portion 16 determines an output voltage value for starting to limit an inverter output according to a distance from when the input voltage V1 fell below a limit starting voltage value Vlim to a limit voltage value Va. An inverter driving portion 17 limits an output by switching FETs in the inverter 3 in accordance with this output voltage value. When a temporary overload is eliminated, then the output recovers to a maximum value.

5 Claims, 4 Drawing Sheets

U.S. PATENT DOCUMENTS

| | | |
|---|---|---|
| 5,563,802 A | 10/1996 | Plahn et al. |
| 6,111,767 A * | 8/2000 | Handleman ................. 363/95 |
| 7,079,406 B2 * | 7/2006 | Kurokami et al. ........ 363/56.03 |
| 7,091,707 B2 * | 8/2006 | Cutler ........................ 323/268 |

FOREIGN PATENT DOCUMENTS

| | | |
|---|---|---|
| JP | 9-70178 A | 3/1997 |
| JP | 11-262256 A | 9/1999 |
| JP | 2003-284330 A | 10/2003 |
| JP | 2004-56937 A | 2/2004 |

OTHER PUBLICATIONS

International Search Report of PCT/JP2005/017017, date of mailing Nov. 15, 2005.

\* cited by examiner

POWER UNIT

TECHNICAL FIELD

The present invention relates to a power unit including an inverter which converts a direct current supplied from a power source into an alternating current with a predetermined frequency and outputs it, more specifically, to a power unit including a regulator for regulating a direct current to be inputted into the inverter.

BACKGROUND ART

In a power unit such as an inverter type power generator, as a generation power source, an engine-driven generator or a small-sized fuel cell may be used. Generally, the output capacities of these generation power sources are not so big. Therefore, fluctuation in generated voltage increases due to load increase and load decrease. Therefore, to suppress this fluctuation, there is known a unit including a regulator provided on an input side of an inverter to regulate an input voltage (refer to Japanese Published Examined Patent Application No. H7-101994).

Patent Document 1: JP 07-101994 B

DISCLOSURE OF THE INVENTION

Problem(s) to be Solved by the Invention

It is possible to maintain an output voltage of an inverter stable by stabilizing an input voltage of the inverter by using a regulator, however, when a load current drastically increases and exceeds generation capacity, the output directly lowers, and this lowering in output causes further lowering in output and falls in a vicious spiral, and as a result, power generation may stop. For example, when a load such as a mercury lamp or motor in which a high current temporarily flows when it starts is connected, if overload temporarily occurs and exceeds generation capacity, the output stops.

An object of the present invention is to provide a power unit which solves the above-described problem and can prevent power exceeding generation capacity of a generation power source from being supplied to a load.

Means for Solving the Problem

To solve the problem, according to a first aspect of the present invention, a power unit includes a regulator which regulates generated power to a predetermined direct current voltage, and an inverter which converts a direct current adjusted in voltage by the regulator into an alternating current with a predetermined frequency and outputs it, wherein the output of the inverter is limited when the input voltage of the regulator lowers to be equal to or less than a predetermined value.

According to a second aspect of the present invention, a power unit includes an inverter which converts generated power into an alternating current with a predetermined frequency and outputs it, wherein the power unit includes a second power source and a converter which supplies a direct current voltage supplied from the second power source to the inverter, and when an input voltage of the converter lowers to be equal to or less than a predetermined value, the output of the inverter is limited.

According to a third aspect of the present invention, the power unit includes a rectifier circuit which rectifies the generated power, and the output of this rectifier circuit is inputted into the regulator or the inverter.

According to a fourth aspect of the present invention, the output of the inverter is limited by lowering an output target voltage of the inverter, and the output target voltage is calculated from the following formula based on the input voltage V1 so that a voltage amplitude value becomes 100% when the output target voltage is equal to or less than a limitation start voltage Va higher than a predetermined limit voltage Vlim, and the voltage amplitude value becomes 0% when the output target voltage is at the limit voltage Vlim.

Voltage amplitude value(%)=$(V1-Vlim)/(Va-Vlim)\times 100$     (Formula 1)

EFFECT OF THE INVENTION

According to the present invention having the first through sixth aspects, when an input voltage of a regulator or converter becomes equal to or less than a predetermined value, an output of the regulator or inverter is limited, so that judgment of overload due to lowering in the input voltage to an overload voltage value is avoided. Then, driving can be continued while securing a maximum output within a capacity range of a power source such as a battery or generator.

According to the second aspect, it is possible to stabilize the input voltage into the inverter and maintain the output voltage stable.

According to the third and fifth aspects, within a capacity range of a second power source, another power source (first power source) can be assisted at a maximum.

According to the fourth aspect, for example, when generated power of an engine generator is used, and when a large load is applied to lower an output voltage during low-revolution driving, first, an output of an electric power is limited by reducing the voltage while maintaining an output current to avoid overload of the regulator, and thereafter, after waiting for an increase in engine revolutions by a speed control mechanism, the output can be restored.

EXPLANATION OF LETTERS OR NUMERALS

1: generator, 2: rectifier circuit (driving inverter), 3: inverse converter, 3-1: DC regulator, 3-2: inverter, 4: bidirectional DC-DC converter, 4-1: transformer, 5: battery, 6, 7: smoothing capacitor, 15: voltage detector, 16: output limited amount determining part, 17: inverter driver, 30: FET, 31: choke coil

BEST MODE FOR CARRYING OUT THE INVENTION

Figure 2:
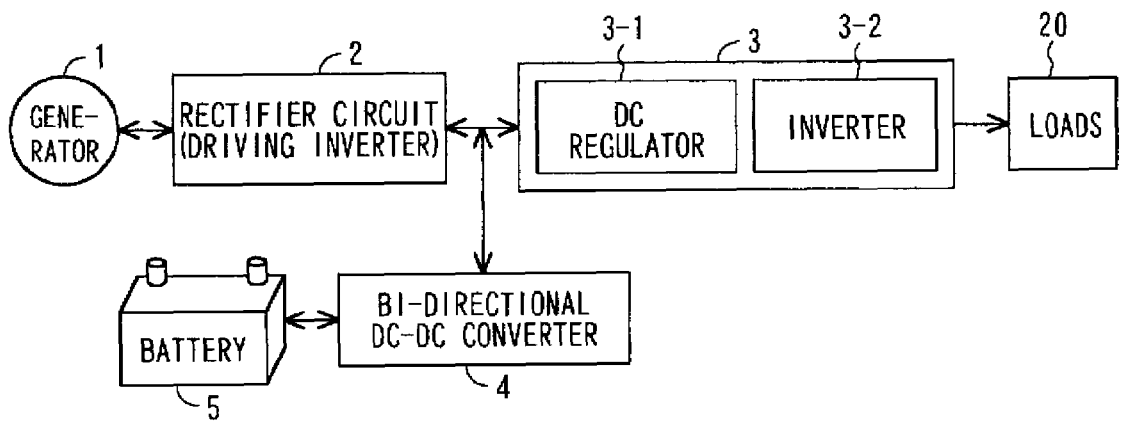
FIG. 2 is a block diagram showing a concept of a power unit according to the present invention.

Hereinafter, the present invention will be described in detail with reference to the accompanying drawings. FIG. 2 is a block diagram showing a power unit according to an embodiment of the present invention. Herein, a power unit is embodied as a generation apparatus including a generator. In this figure, the generator 1 as a first power source is, for example, a three-phase multipolar magnet engine-driven generator whose rotor is driven by an engine that is not shown. The generator 1 can be constructed as a motor-cum-generator which can also operate as an engine starting motor.

The rectifier circuit 2 has bridge-connected rectifier elements, and full-wave-rectifies an output of the generator 1. To the rectifier elements, switching elements such as FETs are connected in parallel. These switching elements are controlled so as to drive the generator 1 as a motor when starting the engine. By turning on and off the switching elements of the rectifier circuit 2, a DC voltage to be applied from the battery 5 as a second power source via the bidirectional DC-DC converter 4 can be converted into a three-phase AC voltage and supplied to the generator 1. That is, the rectifier circuit 2 has a function as a driving inverter for the generator 1 as a motor.

The inverse converter 3 has a DC regulator (switching converter) 3-1 and an inverter 3-2, and converts an output of the rectifier circuit 2 into an AC power with a predetermined frequency and outputs it. This switching converter 3-1 has a function to prevent output fluctuations of the generator 1 and the battery 5 from influencing the input voltage of the inverter 3-2. To the inverter 3-2, various loads 20 including a mercury lamp and a motor in which a large current temporarily flows are connected.

The battery 5 is an external DC power source which supplies auxiliary power to the DC power source energized by the power of the generator 1 as appropriate. That is, this power unit is a hybrid type using power of the generator 1 and power of the battery 5. As means for boosting the voltage of the battery 5 and supplying it to the inverse converter 3, a boost bidirectional DC-DC converter 4 is connected to the output side of the rectifier circuit 2, that is, to the input side of the inverse converter 3. The bidirectional DC-DC converter 4 has a function of charging the battery 5 by the output of the rectifier circuit 2 when the output of the rectifier circuit 2, that is, the generator output is sufficient and the remaining charge of the battery 5 is low. Hereinafter, the battery 5 side of the bidirectional DC-DC converter 4 may be referred to as a primary side and the rectifier circuit 2 side thereof may be referred to as a secondary side. The battery 5 is, for example, a 12 volts type battery which is generally used as a power source of engine starting motors, or a small-sized fuel cell.

Operations of the power unit will be described. The primary side and the secondary side of the bidirectional DC-DC converter 4 are driven by the same drive signal so as to be completely synchronized with each other. By this driving form, the bidirectional DC-DC converter 4 automatically performs bidirectional power conversion as described below.

When starting an engine, based on a relative voltage difference between the primary side and the secondary side due to a transformer turns ratio of the bidirectional DC-DC converter 4, the DC voltage of the battery 5 is boosted by the bidirectional DC-DC converter 4, and the boosted DC voltage is supplied to the driving inverter (rectifier circuit) 2. The driving inverter 2 is switching-driven by a start instruction from a control part that is not shown, and converts the DC voltage into a three-phase AC voltage and supplies it to the generator 1 to start the generator 1 as an engine starting motor.

When the engine starts, the generator 1 is driven by the engine, and the switching operation of the driving inverter 2 is stopped. The output of the generator 1 is rectified by the rectifier circuit (driving inverter) 2 and adjusted in voltage by a switching converter 3-1 of the inverse converter 3, and further converted into an AC power with a predetermined frequency by the inverter 3-2 and outputted.

When the state is not an overload state, a sufficient output is obtained from the rectifier circuit 2 for the load, and power is supplied only by the generator 1 to the load. At this time, no power is supplied from the battery 5 through the bidirectional DC-DC converter 4.

The bidirectional DC-DC converter 4 is connected to the output side of the rectifier circuit 2, so that if it is not in an overload state and the remaining charge of the battery 5 is low, the battery 5 is automatically charged by the output of the rectifier circuit 2 through the bidirectional DC-DC converter 4. That is, when the converted output of the battery 5 is lower than the output voltage of the rectifier circuit 2, based on a relative voltage difference between the primary side and the secondary side due to a turns ratio of the transformer of the bidirectional DC-DC converter 4, power conversion is performed so that the battery 5 is charged by the output of the rectifier circuit 2.

On the other hand, when the load increases and only the output of the generator 1 cannot cope with the load, the output of the rectifier circuit 2 lowers. According to this lowering, power conversion from the primary side to the secondary side of the bidirectional DC-DC converter 4 is automatically performed, and power is supplied from the battery 5 as well. Therefore, when in an overload state, the converted output of the battery 5 is added on the converted output of the generator 1, and power is supplied to the load in a manner that the generator 1 is assisted by the battery 5. When the generator 1 stops for some reason, the battery 5 can supply power to the load by itself through the bidirectional DC-DC converter 4 and the inverse transformer 3.

Figure 3:
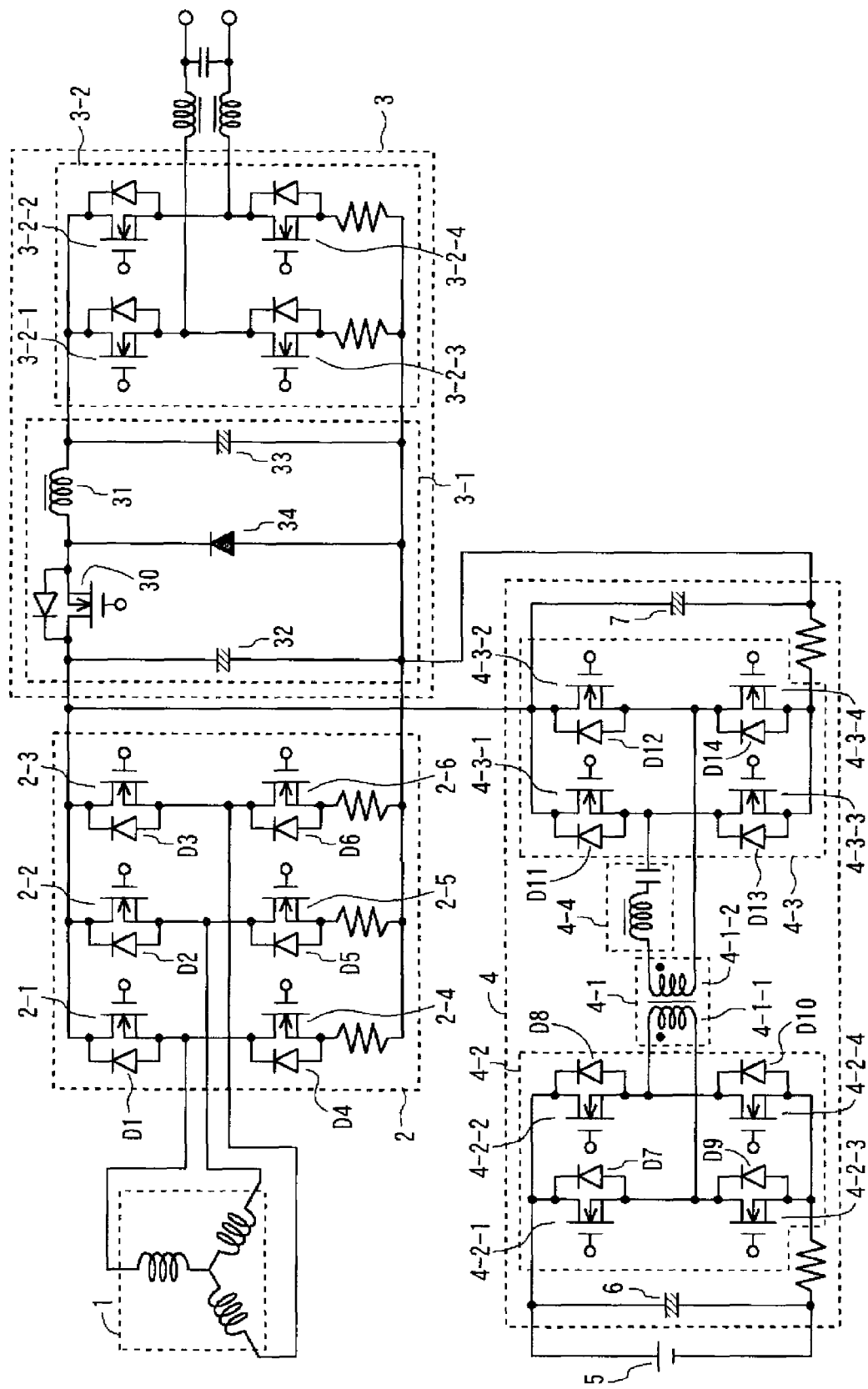
FIG. 3 is a circuit diagram showing a detailed circuit of an embodiment of the power unit of the present invention.

FIG. 3 is a detailed circuit diagram of an embodiment of the power unit of the present invention, and a component identical or equivalent to that in FIG. 2 is attached with the same reference numeral. The three-phase generator 1 is connected to an engine (not shown). The output side of the generator 1 is connected to a driving inverter 2. The driving inverter 2 is constructed by, for example, bridge-connecting six switching elements (hereinafter, referred to as FETs) 2-1 through 2-6 such as FETs.

To the FETs 2-1 through 2-6, rectifier elements D1 through D6 such as diodes are connected in parallel, respectively, to form a rectifier circuit 2. When the rectifier elements D1 through D6 are MOS-FETs, they may be parasitic diodes which are structurally derived in the MOS-FET structure, or may be diodes separately connected.

The output side of the rectifier circuit 2 is connected to the switching converter 3-1 of the inverse converter 3. In the example of FIG. 3, the switching converter 3-1 is a voltage step-down switching converter and includes, for example, an FET 30, a choke coil 31, capacitors 32 and 33, and a diode 34, etc., and the inverter 3-2 is constructed by, for example, bridge-connecting four FETs 3-2-1 through 3-2-4.

The connection point between the rectifier circuit 2 and the inverse converter 3 is connected to the secondary side of the bidirectional DC-DC converter 4, and the primary side of the DC-DC converter 4 is connected to the battery 5.

The bidirectional DC-DC converter 4 bidirectionally interchanges power between the battery 5 and the output of the rectifier circuit 2, and includes a transformer 4-1 that has a low voltage side coil 4-1-1 on the primary side and a high voltage side coil 4-1-2 on the secondary side. The step-up ratio of the bidirectional DC-DC converter 4 is determined according to the turns ratio of the low voltage side coil 4-1-1 and the high voltage side coil 4-1-2.

A low voltage side switching part 4-2 is inserted into the low voltage side coil 4-1-1 side, and a high voltage side switching part 4-3 is inserted into the high voltage side coil 4-1-2 side. The low voltage side switching part 4-2 is constructed by, for example, bridge-connecting four FETs 4-2-1 through 4-2-4, and the high-voltage side switching part 4-3 is also similarly constructed by four FETs 4-3-1 through 4-3-4.

To the FETs 4-2-1 through 4-2-4 and 4-3-1 through 4-3-4 of the low voltage side switching part 4-2 and the high voltage side switching part 4-3, rectifier elements D7 through D10 and D11 through D14 such as diodes are connected in parallel, respectively. These rectifier elements D7 through D10 and D11 through D14 may also be FET parasitic diodes, or may be separately connected diodes. By adding the parallel-connected rectifier elements D7 through D10 and D11 through D14, the low voltage side switching part 4-2 and the high-voltage side switching part 4-3 can be regarded as switching and rectifying parts, respectively.

To the high voltage side coil 4-1-2 side of the transformer 4-1, an LC resonance circuit 4-4 is inserted. The LC resonance circuit 4-4 functions to shape the form of a current flowing when at least one of the low voltage side switching part 4-2 and the high voltage side switching part 4-3 is driven into a sinusoidal form, and reduces the switching loss, and prevents breakage of FETs due to a high current. This can be realized since the FETs can be turned on and off near the zero cross point of the sinusoidal-form current. The LC resonance circuit 4-4 may be provided on the primary side instead of the secondary side.

The FETs 4-2-1 through 4-2-4 of the low voltage side switching part 4-2 and the FETs 4-3-1 through 4-3-4 of the high voltage side switching part 4-3 are switching-controlled by a control circuit (not shown) including a CPU, etc. The capacitors 6 and 7 connected to the primary side and the secondary side are output smoothing capacitors.

Next, operations will be described with reference to FIG. 3. For automatic bidirectional power conversion of the bidirectional DC-DC converter 4, the lower voltage side switching part 4-2 and the high voltage side switching part 4-3 are completely synchronized with each other by driving these by the same signal. This driving is performed by alternately turning on and off the pair of FETs 4-2-1 and 4-2-4 and the pair of FETs 4-2-2 and 4-2-3 in the low voltage side switching part 4-2, and alternately turning on and off the pair of FETs 4-3-1 and 4-3-4 and the pair of FETs 4-3-2 and 4-3-3 in the high voltage side switching part 4-3 as generally known.

When starting the engine, power conversion from the primary side to the secondary side of the bidirectional DC-DC converter 4 is performed, and the DC voltage of the battery 5 boosted by the power conversion is supplied to the driving inverter (rectifier circuit) 2. The driving inverter 2 converts this DC voltage into a three-phase AC voltage and applies it to the generator 1, and starts the generator as an engine starting motor. This starting is performed by PWM driving of the FETs 2-1 through 2-6 of the driving inverter as generally known. At this time, phase discrimination is performed by using a change in current distribution due to a counter electromotive voltage caused according to the operation of the generator (motor) 1, and synchronized driving can be performed under sensor-less control.

When the engine starts, the generator 1 is driven by the engine and generates an output. The output of the generator 1 is rectified by the rectifier circuit (driving inverter) 2. At this time, the FETs 2-1 through 2-6 constituting the driving inverter are not driven, and the output of the generator 1 is full-wave-rectified by the rectifier elements D1 through D6 of the rectifier circuit 2. The output of the rectifier circuit 2 is smoothed and adjusted by the switching converter 3-1 of the inverse transformer 3, and further converted into an AC power with a predetermined frequency by the inverter 3-2 and outputted. DC regulation of the switching converter 3-1 is performed by PWM-modulating the FET 30.

When the remaining charge of the battery 5 is low, the battery 5 is charged by the output of the rectifier circuit 2 stepped down by the bidirectional DC-DC converter 4 as described based on FIG. 2. When an overload state occurs and the output of the generator 1 cannot cope with the load, power is also supplied from the battery 5 as well through the bidirectional DC-DC converter 4.

Thus, the bidirectional DC-DC converter 4 automatically exchanges power between the primary side and the secondary side according to a relative voltage difference between the primary side and the secondary side due to the turns ratio of the transformer 4-1, and interchanges power therebetween.

In the present embodiment, means for avoiding stop of the output from a power source due to mismatch between the protection function of the switching converter 3-1 and the capacity of the power source, that is, the generator 1 or the battery 5, is provided.

Figure 4:
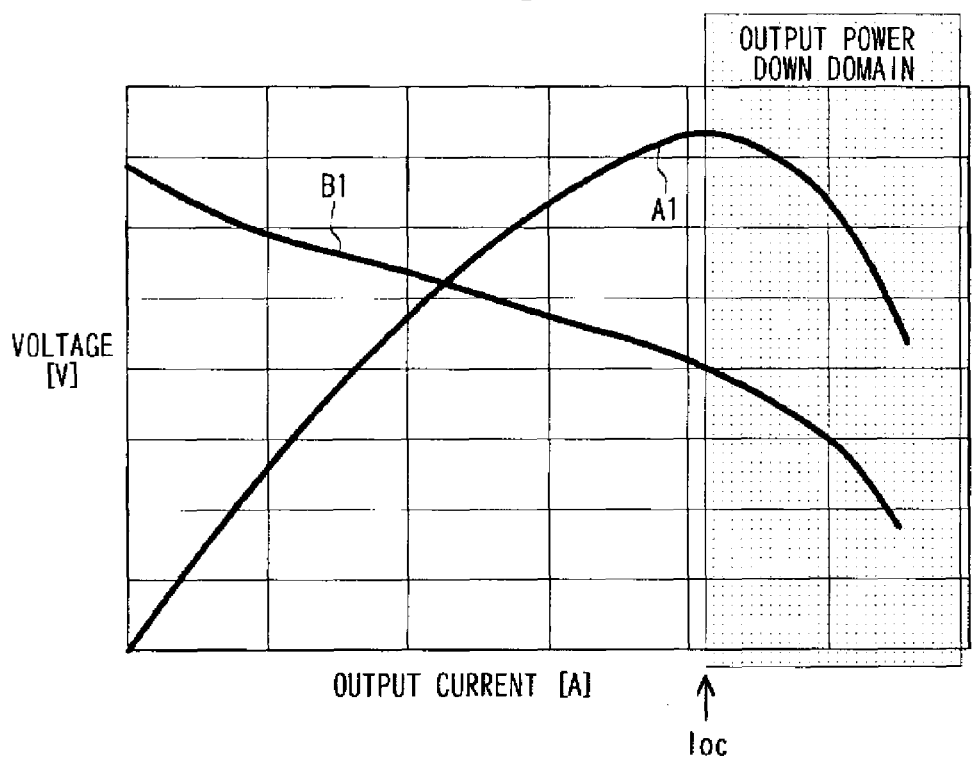
FIG. 4 is an output characteristic chart of an engine generator.

FIG. 4 is an output characteristic chart of a power unit using the generator 1 as a power source. In FIG. 4, the line A1 shows an output power characteristic of the generator 1, and the line B1 shows a primary side voltage characteristic (power source voltage characteristic) of the switching converter 3-1. When the output current reaches a predetermined value Ioc, the primary side voltage of the switching converter 3-1 lowers, and accordingly, the output power of the inverter 3-2 also drastically lowers.

Figure 5:
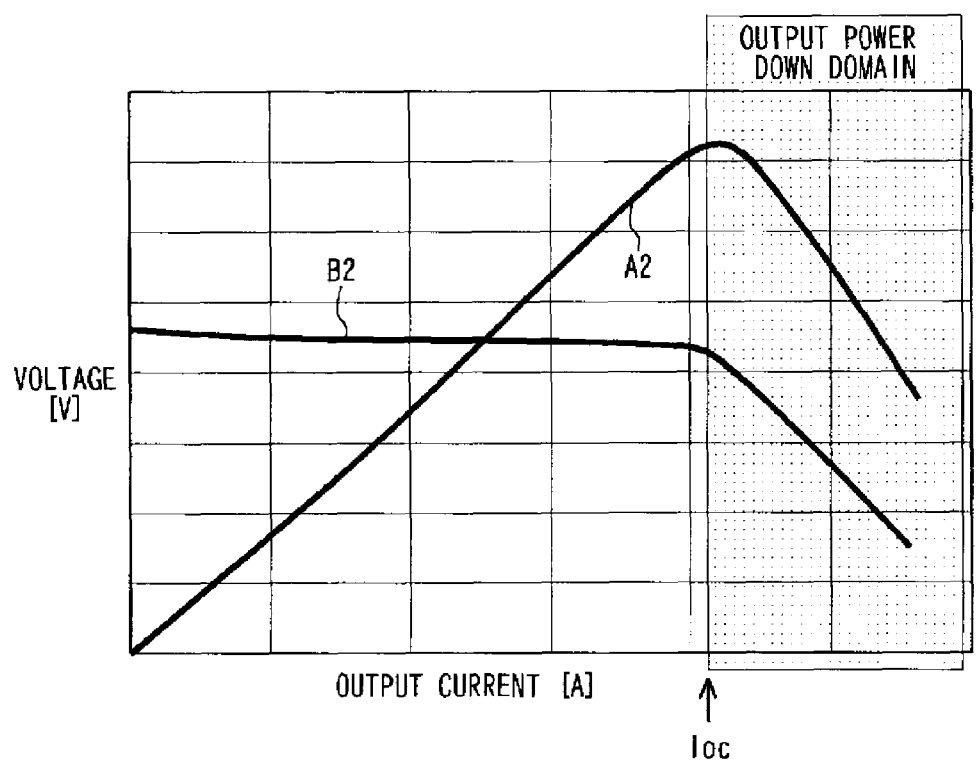
FIG. 5 is an output characteristic chart of a battery.

FIG. 5 is an output characteristic chart of a power unit using the battery 5 as a power source. In FIG. 5, the line A2 shows an output power characteristic of the inverter 3-2, and the line B2 shows a primary side voltage characteristic (power source voltage characteristic) of the switching converter 3-1. When the output current reaches a predetermined value Ioc, the primary side voltage of the switching converter 3-1 lowers, and accordingly, the output power of the inverter 3-2 also drastically lowers.

Thus, in all power units, in the case of overload, the output power drastically lowers. Therefore, by setting a voltage Va slightly higher than a voltage (limit voltage) Vlim corresponding to the current value Ioc at which the power source voltage starts lowering due to an overcurrent as a threshold value, control is started to limit the output voltage of the inverter 3-2 when the power source voltage V1 lowers to the voltage Va or lower (see FIG. 6).

Figure 1:
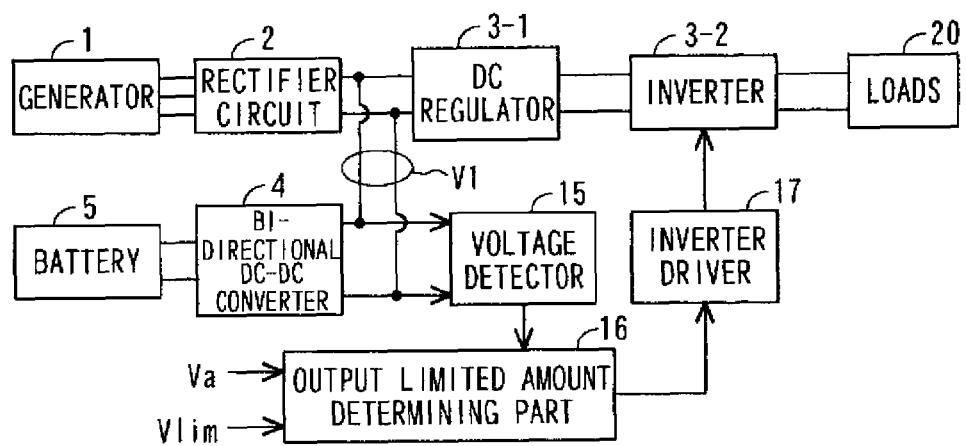
FIG. 1 is a block diagram of an output limiting controller according to an embodiment of the present invention.

FIG. 1 is a block diagram of an output stop avoiding controller for the generator 1 against overload, and the same reference numeral as in FIG. 3 shows an identical or equivalent component. In FIG. 1, the voltage detector 15 detects a primary side voltage V1 of the switching converter 3-1. When the primary side voltage V1 detected by the voltage detector 15 becomes the limitation start voltage Va or less, the output limited amount determining part 16 calculates an output voltage of the inverter 3-2 by means of proportional calculation based on which point the primary side voltage V1 is at between the limit voltage Vlim and the limitation start voltage Va. The proportional calculation will be described later. The calculated output voltage value is inputted into the inverter driver 17, and the inverter driver 17 drives the FETs 3-2-1 through 3-2-4 based on this output voltage value, that is, by setting the output voltage value as a target value. Thereby, when the primary side voltage V1 becomes the limitation start voltage Va or less, the output voltage of the inverter 3-2 is lowered, and an output in comparison with the power source, that is, the generator 1 or the battery 5 becomes lower, so that a margin is obtained in the power source, and output stop is avoided.

Figure 6:
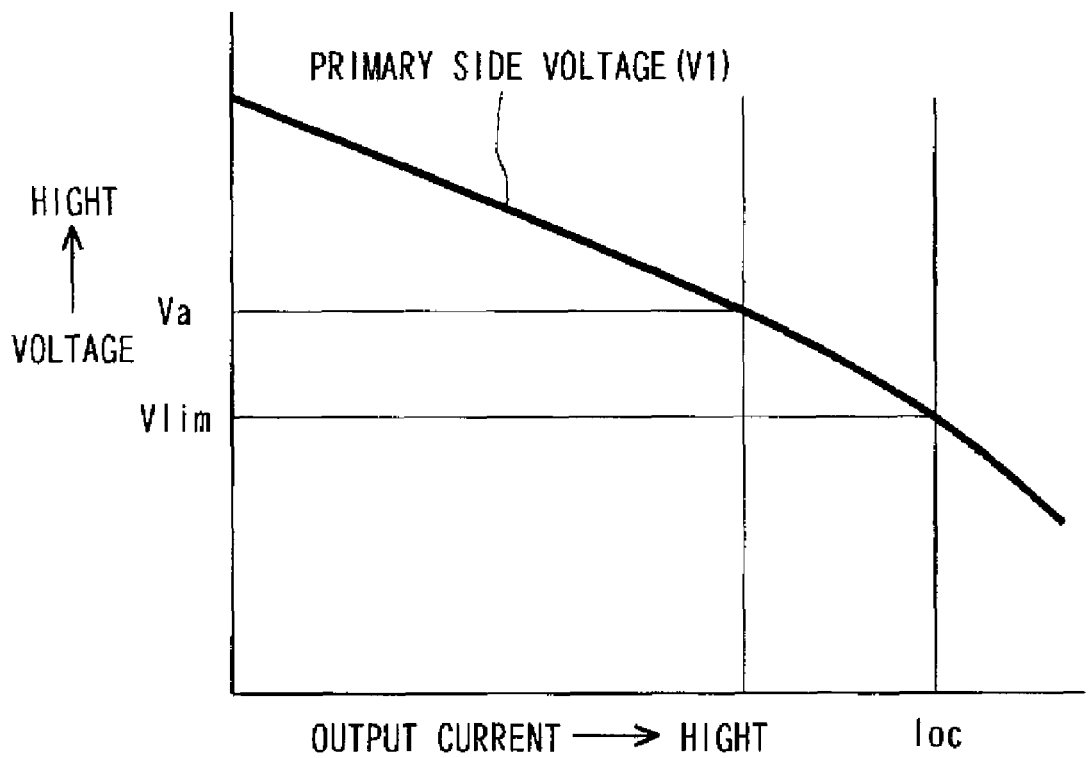
FIG. 6 is an output characteristic chart of an engine generator shown for describing output limitation.

FIG. 6 is a characteristic chart of a power unit for explaining proportional calculation for determining the output voltage value. In this figure, when a current increases, the power source voltage V1 lowers, and when this power source voltage V1 lowers to the limitation start voltage V1, the output limitation control is started. That is, when the primary side voltage V1 becomes the limitation start voltage Va or less, based on which point the power source voltage is at between the limitation start voltage Va and the limit voltage Vlim, the output voltage value (voltage amplitude value (%)) is calculated from the following formula:

$$\text{Voltage amplitude value}(\%)=(V1-Vlim)/(Va-Vlim)\times 100 \quad \text{(Formula 1)}.$$

When the generator 1 that has an automatic engine revolution speed control mechanism is included in a power source, it is possible that a limit voltage Vlim can be set for each target revolution speed of the engine.

By the above-described control, for example, when a motor with a high inrush current is the load 20, overload is prevented at the time of inrush, and the output of the power source can be prevented from being stopped. When the output current is reduced after the time of inrush, the voltage amplitude value can be restored to 100% and regular driving can be performed.

When the generator 1 that has an automatic engine revolution speed control mechanism is included in a power source, it is possible that a limitation start voltage Va can be set for each target revolution speed of the engine. In the generator 1 having an automatic engine revolution speed control mechanism, in the case of a low revolution speed, when the primary side voltage V1 lowers to the limitation start voltage Va or less corresponding to the low revolution speed, output limitation is started. During this limitation, the output, that is, the load on the engine falls within its rating. Thus, the load power is temporarily fixed and output stop of the generator 1 is avoided, and then the engine revolution speed is raised so as to cope with a high load, and while raising the output of the generator 1, the voltage amplitude value is restored to 100%. Thereby, even if a high load occurs during low revolution driving, the output can be limited to a power in accordance with each revolution speed, and during this limitation, the output can be increased so as to cope with load fluctuation.

In the above-described embodiment, a power unit including the inverter 3-2 was described. However, the present invention is also applicable to the case where the switching converter 3-1 is directly used as an output of the power unit without providing an inverter. In the case where the inverter is not provided, when the primary side voltage V1 reaches the limitation start voltage Va, output limitation of the switching converter 3-1 is started. In detail, the output voltage is lowered by changing a duty ratio of the FET 30 of the switching converter 3-1.

The present invention is not limited to the hybrid type power unit including the generator 1 and the battery 5. A power unit can be constructed for which, by using only either one of the engine-driven generator 1 or the battery 5 as a power source, a DC voltage supplied from such a power source is adjusted by the switching converter, that is, a regulator and directly outputted, or is converted into an alternating current by the inverter and outputted.

For example, there is a possible embodiment in which the battery 5 is used as a main power source and the generator 1 is used as an auxiliary power source. That is, it is also assumed that the generator 1 is started when an output is supplied only by the battery 5 to the load. In this case, the battery 5 is supplied with a current to start the generator 1 while supplying an output to the load. That is, to the battery 5, starting energy of the generator 1 is added as a load in addition to the load 20. According to the present invention, even when the load temporarily increases as described above, it is possible that the primary side voltage of the regulator is detected and, in the case where a regulator or an inverter is provided, an output of the inverter can be limited.

As in the embodiment of FIG. 3, when a converter 4 that steps-up the DC voltage of the battery 5 as a second power source is provided, it is also allowed that an input voltage of the converter 4 is detected and the output of the inverter 3-2 is limited by this input voltage and the limitation start voltage.

What is claimed is:

1. A power unit comprising:
   a regulator which regulates generated power to a predetermined DC voltage, and an inverter which converts the direct current adjusted in voltage by the regulator into an alternating current with a predetermined frequency and outputs it; and
   control means which detects an input voltage of the regulator, and when the input voltage lowers to a predetermined value or less, limits the output of the inverter;
   wherein the output of the inverter is limited by lowering an output target voltage of the inverter.

2. A power unit comprising:
   an inverter that converts power generated from a first power source into an alternating current with a predetermined frequency and outputs it;
   a second power source provided separately from the first power source which generates electric power;
   a converter for supplying a DC voltage supplied from the second power source to the inverter; and
   control means which detects an input voltage of the converter, and when this input voltage lowers to a predetermined value or less, limits the output of the inverter;
   wherein the output of the inverter is limited by lowering an output target voltage of the inverter.

3. The power unit according to claim 1, wherein a generator and a rectifier circuit that rectifies an output of the generator are provided wherein an output of the rectifier is inputted into the inverter.

4. The power unit according to claim 2, wherein the first power source and a rectifier circuit that rectifies an output of the first power source are provided wherein an output of the rectifier is inputted into the inverter.

5. A power unit according to any of claims 1 through 4, wherein
   the output target voltage is calculated by the following formula:

$$\text{voltage amplitude value}(\%)=(V1-Vlim)/Va-Vlim)\times 100 \quad \text{(Formula 1)}$$

based on the input voltage V1 so that the voltage amplitude value becomes 100% when the output target voltage is equal to or less than a limitation start voltage Va higher than a predetermined limit voltage Vlim, and the voltage amplitude value becomes 0% when the output target voltage is at the limit voltage Vlim.

* * * * *